United States Patent
Lee-Tuffnell

(10) Patent No.: US 7,842,256 B2
(45) Date of Patent: Nov. 30, 2010

(54) CATALYTIC REACTOR

(75) Inventor: Clive Derek Lee-Tuffnell, Poole (GB)

(73) Assignee: CompactGTL PLC, Oxfordshire (GB)

( * ) Notice: Subject to any disclaimer, the term of this patent is extended or adjusted under 35 U.S.C. 154(b) by 359 days.

(21) Appl. No.: 11/815,015

(22) PCT Filed: Jan. 18, 2006

(86) PCT No.: PCT/GB2006/050011

§ 371 (c)(1),
(2), (4) Date: Aug. 9, 2007

(87) PCT Pub. No.: WO2006/079848

PCT Pub. Date: Aug. 3, 2006

(65) Prior Publication Data

US 2008/0193347 A1 Aug. 14, 2008

(30) Foreign Application Priority Data

Jan. 31, 2005 (GB) ................... 0501731.4

(51) Int. Cl.
*B01J 8/02* (2006.01)
*B01J 19/00* (2006.01)

(52) U.S. Cl. ............... 422/211; 422/190; 422/198; 422/222; 422/240

(58) Field of Classification Search .......... 422/211, 422/222, 190, 240, 198
See application file for complete search history.

(56) References Cited

U.S. PATENT DOCUMENTS

| 4,199,523 | A | 4/1980 | Rottig |
| 6,211,255 | B1 | 4/2001 | Schanke |
| 6,680,044 | B1 | 1/2004 | Tonkovich |
| 7,087,651 | B2 | 8/2006 | Lee-Tuffnell et al. |
| 7,186,388 | B2 | 3/2007 | Bowe et al. |
| 7,189,271 | B2 | 3/2007 | Maude |
| 7,201,883 | B2 | 4/2007 | Bowe et al. |

(Continued)

FOREIGN PATENT DOCUMENTS

WO 0151194 A1 7/2001

(Continued)

OTHER PUBLICATIONS

PCT Preliminary Report (PCT/GB2006/050011), dated Jan. 31, 2005.

(Continued)

*Primary Examiner*—Walter D Griffin
*Assistant Examiner*—Lessanework Seifu
(74) *Attorney, Agent, or Firm*—McDermott Will & Emery

(57) ABSTRACT

A compact catalytic reactor for Fischer-Tropsch synthesis defines a multiplicity of first and second flow channels arranged alternately in the reactor, for carrying a gas mixture which undergoes Fischer-Tropsch synthesis, and a coolant fluid, respectively. Each first flow channel contains a removable gas-permeable catalyst structure incorporating a metal substrate. A multiplicity of flow paths are defined through the catalyst structure, and the voidage, that is to say the proportion of the cross-sectional area of the first flow channel constituted by the said multiplicity of flow paths, is between 25% and 70%. This provides an optimum balance between productivity and selectivity, so that operation of the reactor can be economic and controllable.

16 Claims, 1 Drawing Sheet

U.S. PATENT DOCUMENTS

| | | |
|---|---|---|
| 7,223,373 B2 | 5/2007 | Maude |
| 7,235,218 B2 | 6/2007 | Bowe |
| 7,351,750 B2 | 4/2008 | Bowe |
| 2004/0237303 A1 | 12/2004 | Maude |
| 2005/0013769 A1 | 1/2005 | Bowe |

FOREIGN PATENT DOCUMENTS

| | | | |
|---|---|---|---|
| WO | WO 03/033131 | * | 4/2003 |
| WO | 03048034 A1 | | 6/2003 |

OTHER PUBLICATIONS

GB Search Report (GB0501731.4), dated May 25, 2005.
PCT Search Report and Written Opinion (PCT/GB2006/050011), dated Apr. 19, 2006.
Communication pursuant to Article 94(3) EPC (06700796.3—2104), dated Apr. 9, 2008.

* cited by examiner

CATALYTIC REACTOR

This invention relates to a catalytic reactor suitable for use in a chemical process to convert natural gas to longer-chain hydrocarbons, in particular for performing Fischer-Tropsch synthesis, and to a plant including such a catalytic reactor to perform the process.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid or waxes under ambient conditions. The two stages of the process, steam/methane reforming and Fischer-Tropsch synthesis, require different catalysts, and heat to be transferred to or from the reacting gases, respectively, as the reactions are respectively endothermic and exothermic. Reactors for these reactions may be formed as a stack of plates, with flow channels defined between the plates, the flow channels for the different fluids alternating in the stack. In those channels that require a catalyst, this is preferably in the form of a metal substrate carrying the catalyst in a ceramic coating, such structures being removable from the channels when the catalyst is spent. The catalyst structure provides a large surface area for contact between the reacting gases and the catalytic material, but at the same time it inhibits flow of the reacting gases through the channel.

According to the present invention there is provided a compact catalytic reactor for Fischer-Tropsch synthesis defining a multiplicity of first and second flow channels arranged alternately in the reactor, for carrying a gas mixture which undergoes Fischer-Tropsch synthesis, and a coolant fluid, respectively; wherein each first flow channel contains a removable gas-permeable catalyst structure comprising a non-porous metal substrate with a continuous ceramic coating of substantially uniform thickness no more than 200 µm on at least one surface of the substrate, the ceramic coating incorporating catalytic material, the catalyst structure defining mesopores and macropores providing a pore surface area in the range 80-120 $m^2/g$, and the catalyst structure being shaped so as to define a multiplicity of bulk flow paths therethrough, wherein the voidage, that is to say the proportion of the cross-sectional area of the first flow channel constituted by the said multiplicity of bulk flow paths, is between 25% and 77%.

Preferably the voidage is between about 35% and 75%, more preferably between 60% and 72%.

It should be understood that the Fischer-Tropsch reaction is a comparatively slow reaction. The purpose of the Fischer-Tropsch synthesis is to generate hydrocarbons in which the carbon chain is longer than that of methane, and indeed preferably at least C5 and so are normally liquids and/or waxes. A practical reactor must therefore generate a significant quantity of such longer-chain hydrocarbons per unit time, and should be selective towards the formation of such longer-chain hydrocarbons rather than methane. It has been found that if the voidage is less than about 25% then the productivity is too low to be economic, while if the voidage is above about 77% the productivity can be high but the production of methane will become excessive.

The Fischer-Tropsch reaction is typically carried out at a temperature about 200° C., so a wide range of materials may be selected for the reactor. For example the reactor may be made of an aluminium alloy, stainless steel, high-nickel alloys, or other steel alloys.

Preferably the metal substrate for the catalyst structure is a steel alloy that forms an adherent surface coating of aluminium oxide when heated, for example an aluminium-bearing ferritic steel such as iron with 15% chromium, 4% aluminium, and 0.3% yttrium (eg Fecralloy (™)). When this metal is heated in air it forms an adherent oxide coating of alumina, which protects the alloy against further oxidation and against corrosion. Where the ceramic coating is of alumina, this appears to bond to the oxide coating on the surface. The substrate is preferably a thin metal foil for example of thickness less than 100 µm, and the substrate may be corrugated, pleated or otherwise shaped so as to define the multiplicity of flow paths.

The catalyst structure preferably comprises a ceramic coating of thickness between 40 µm and 200 µm, more preferably of thickness between 60 µm and 100 µm. This coating defines pores, and incorporates particles of the catalytic metals.

Such a catalyst structure incorporating catalytic material may be inserted into a flow channel of a reactor in which flow channels for the Fischer-Tropsch reaction alternate with flow channels to remove heat. The metal substrate of the catalyst structure within the flow channels enhances heat transfer and catalyst surface area. The catalyst structures are removable from the channels in the module, so they can be replaced if the catalyst becomes spent. The flow paths defined by the catalyst structure may have any suitable cross-sectional shape. At least some of the flow paths may communicate with each other along their length, or alternatively the flow paths may all be separated from each other by the catalyst structure. Preferably all the surfaces forming the catalyst structure incorporate catalytic material.

Where the channel depth is no more than about 3 mm, then the catalyst structure may for example be a single shaped foil. Alternatively, and particularly where the channel depth is greater than about 2 mm, the preferred catalyst structure comprises a plurality of such shaped foils separated by substantially flat foils; the shaped foils and flat foils may be bonded to each other, or alternatively may be inserted as separate items. To ensure the required good thermal contact, the channels for the Fischer-Tropsch reaction are preferably less than 20 mm deep, and more preferably less than 10 mm deep. Desirably the temperature within the channels is maintained uniformly across the channel width, within about 2-4° C., and this is more difficult to achieve the larger the channel becomes.

The reactor module may comprise a stack of plates. For example, first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. The stack of plates forming the reactor module is bonded together for example by diffusion bonding, brazing, or hot isostatic pressing.

Hence a plant for processing natural gas to obtain longer chain hydrocarbons may incorporate a steam/methane reforming reactor, to react methane with steam to form synthesis gas, and a Fischer-Tropsch reactor of the invention to generate longer-chain hydrocarbons.

The invention will now be further and more particularly described, by way of example only, and with reference to the accompanying drawings, in which.

Figure 1:
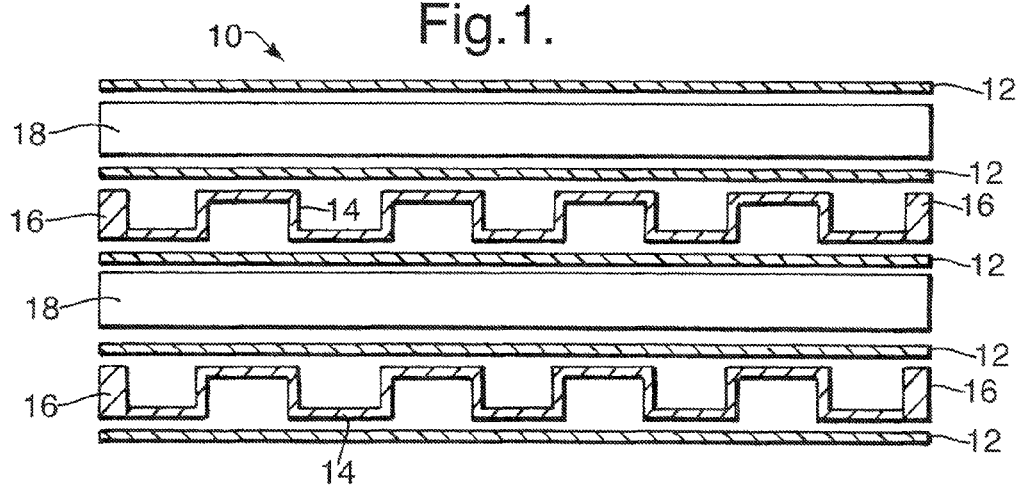
FIG. 1 shows a sectional view of part of a reactor suitable for Fischer-Tropsch synthesis.

The invention is of relevance to a chemical process for converting natural gas (primarily methane) to longer chain hydrocarbons. The first stage of this process involves steam reforming, that is to say the reaction of the type:

$$H_2O + CH_4 \rightarrow CO + 3\,H_2$$

This reaction is endothermic, and may be catalysed by a rhodium or platinum/rhodium catalyst in a flow channel. The heat required to cause this reaction may be provided by combustion of an inflammable gas such as methane or hydrogen, which is exothermic and may be catalysed by a platinum/palladium catalyst in an adjacent second gas flow channel.

The gas mixture produced by the steam/methane reforming is then used to perform a Fischer-Tropsch synthesis to generate a longer chain hydrocarbon, that is to say:

$$n\,CO + 2n\,H_2 \rightarrow (CH_2)_n + n\,H_2O$$

which is an exothermic reaction, occurring at an elevated temperature, typically between 190° C. and 280° C., and an elevated pressure typically between 1.5 MPa and 2.5 MPa (absolute values), in the presence of a catalyst such as iron, cobalt or fused magnetite. The preferred catalyst for the Fischer-Tropsch synthesis comprises a coating of gamma-alumina of specific surface area 140-230 $m^2/g$ with about 10-40% cobalt (by weight compared to the alumina), and with a promoter such as ruthenium, platinum or gadolinium which is less than 10% the weight of the cobalt, and a basicity promoter such as lanthanum oxide. After the deposition of the ceramic and impregnation and then reduction to provide catalyst particles, the specific surface area is preferably about 80-110 $m^2/g$ (as measured by the BET gas adsorption technique), for example 90 $m^2/g$. The specific pore volume, as measured by mercury intrusion porosimetry, of the as-supplied alumina is preferably in the range 0.37 to 0.47 $cm^3/g$, while that of the catalyst-containing ceramic is in the range 0.20 to 0.26 $cm^3/g$ (as measured by the BET technique), for example 0.24 $cm^3/g$.

The stream of high pressure carbon monoxide and hydrogen produced by steam methane reforming is cooled and compressed to the elevated pressure, say 2.0 MPa, and is then fed to a catalytic Fischer-Tropsch reactor, this being a compact catalytic reactor formed from a stack of plates as described above; the reactant mixture flows through one set of channels, while a coolant flows through the other set.

The reaction products from the Fischer-Tropsch synthesis, predominantly water and hydrocarbons such as paraffins, are cooled to condense the liquids by passage through a heat exchanger and a cyclone separator followed by a separating chamber in which the three phases water, hydrocarbons and tail gases separate, and the hydrocarbon product is stabilised at atmospheric pressure. The hydrocarbons that remain in the gas phase and excess hydrogen gas (the Fischer-Tropsch tail gases) are collected and split. A proportion may be passed through a pressure reduction valve to provide the fuel for the catalytic combustion process in the reformer (as described above). The remaining tail gases may be fed to a gas turbine arranged to generate electricity. The major plant electrical power needs are the compressors used to raise the pressure to that required for the Fischer-Tropsch reaction; electricity may also be used to operate a vacuum distillation unit to provide process water for steam generation.

Referring now to FIG. 1 there is shown a part of a reactor 10 suitable for use as a Fischer-Tropsch reactor, the reactor 10 being shown in section and with the components separated for clarity. The reactor 10 consists of a stack of flat plates 12 of thickness 1 mm spaced apart so as to define channels for a coolant fluid alternating with channels for the Fischer-Tropsch synthesis. The coolant fluid channels are defined by castellated plates 14 of thickness 0.75 mm. The height of the castellations (typically in the range 1 to 4 mm) is 2 mm in this example, and 2 mm thick solid edge strips 16 are provided along the sides, and successive ligaments are 6 mm apart. The channels for the Fischer-Tropsch synthesis are of height 5 mm, being defined by bars 18 of square cross-section, 5 mm high, spaced apart by 350 mm and so defining straight through channels. (Alternatively, the channels for the Fischer-Tropsch synthesis might instead be defined by castellated plates, so that the individual channels might be for example 5 mm high and a 10 mm wide, or for example 3 mm high and 20 mm wide.) The flat plates 12, the bars 18, and the other structural components may be of aluminium alloy, for example 3003 grade (aluminium with about 1.2% manganese and 0.1% copper).

Figure 2:
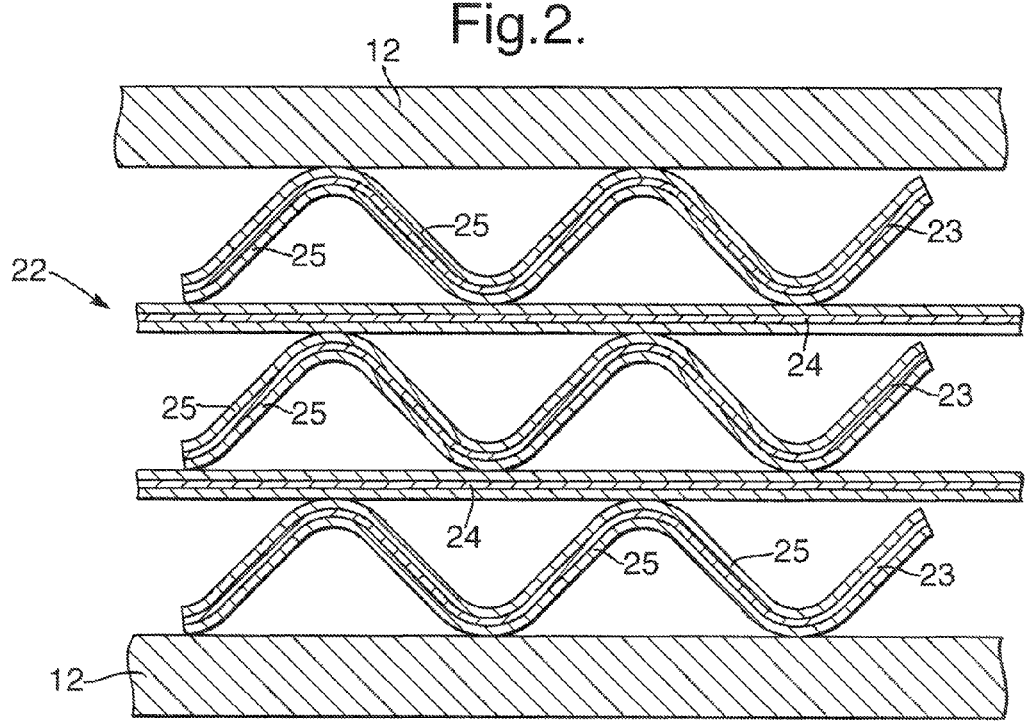
FIG. 2 shows a catalyst carrier for use in the reactor of FIG. 1.

The stack is assembled as described above, and then bonded together to form the reactor 10 for example by brazing. As shown in FIG. 2, to which reference is now made, catalyst carriers 22 which incorporate an appropriate catalyst are then inserted into the channels for the Fischer-Tropsch synthesis, and are of the same width and height as the corresponding channel. In this case the carrier 22 in each channel for Fischer-Tropsch synthesis is made of three corrugated foils 23 in which the corrugations are of height 1.3 mm, separated by nominally flat foils 24, all these foils being of thickness 50 μm. The nominally flat foils 24 are preferably corrugated at a very small amplitude, for example to give a total height of about 0.1 mm, as this makes them slightly less flexible, and so easier to work with, and to insert. Each foil is coated with a catalyst layer 25 of thickness about 80 μm on each surface, preferably of alumina ceramic. The ceramic will have mesopores, of characteristic size in the range 2 nm to 20 nm, which provide the majority of sites for the dispersed catalyst metal. Preferably these mesopores are of size between 10 and 16 nm, more preferably between 12 and 14 nm. For this Fischer-Tropsch synthesis it is also necessary for there to be larger mesopores and also macropores, that is to say pores of size at least 50 nm and above. Such a macroporous content may for example be obtained by spraying droplets containing comparatively large alumina particles, for example non-dispersible gamma alumina particles in the range 5-40 μm, along with some alumina sol to act as a supporting agent and as a binder. Resulting gaps between the alumina particles provide the requisite macropores. The ceramic layer must also incorporate the appropriate catalyst, for example noble-metal promoted cobalt; the catalytic metals may be deposited in the form of the nitrate salt into the ceramic layer, and then heated and reduced to metal.

It will be appreciated that the cross-sectional area of a foil is determined by the total foil thickness, the height of the corrugations, and by the wavelength of the corrugations. In this example the total thickness of each foil (including the ceramic coatings) is about 210 μm, and the corrugations are of overall height 1.5 mm; the wavelength of the corrugations is about 2.5 mm. The voidage, that is to say the proportion of the cross-sectional area constituted by the flow paths, is hence about 71%. It will be appreciated that the voidage takes account only of the bulk gas flow paths; the porosity of the ceramic does not contribute to the flow paths (because the porosity is too low and because the pores are too small). During use the pores within the ceramic are mainly occupied by liquid hydrocarbons and so do not provide a path for gas flow. It will be appreciated that all the flow paths have catalyst on at least some of their surfaces; all the flow paths that pass between the foils have catalyst on all of their surfaces.

In this example the corrugated foils 23 and the flat foils 24 are coated with catalyst separately, by a spraying procedure, and are not fixed to each other; they are merely inserted into the flow channel. Alternatively at least some of the foil surfaces might instead not be provided with a catalyst coating 25, for example the nominally flat foils 24 might not be coated at all, or might be coated on just one side. As another alternative the foils might be fixed to each other before being inserted into the flow channel. It will also be appreciated that the corrugations may have a different shape to that shown, for example they might be zigzag corrugations, or sharp peaks separated by flat sections. They may have a different size, as to amplitude and as to wavelength. It will also be appreciated that the size of the channel may differ from that described above. However, the flow channels are preferably at least 1 mm deep, preferably at least 2 mm deep, to provide adequate space for catalyst; and are preferably no more than 20 mm deep, more preferably no more than 10 mm deep, as it is difficult to ensure substantially uniform temperature throughout such a deep channel.

The production rate of C5+ hydrocarbons depends upon the mass flow of carbon monoxide through the reactor; on the conversion (the proportion of carbon monoxide which undergoes reaction); and the selectivity (the proportion of hydrocarbon product which is C5+). For a particular catalyst type and catalyst thickness, and for fixed pressure and temperature within the reactor, the conversion and the selectivity are primarily determined by the space velocity (defined as the volume flow rate of the feed gas at STP divided by the volume of reactor channel available for fluid flow). The space velocity can therefore be selected to provide optimum conversion and selectivity.

If the voidage is less than about 25%, the productivity becomes uneconomic. This is because, if the space velocity is held constant (for optimum conversion and selectivity), the decrease in voidage corresponds to a decrease in the flow rate of carbon monoxide through the reactor, and so reduced productivity. If the flow rate is not decreased in proportion to the decreased voidage, then there is an increase in space velocity, and consequently reduced conversion of carbon dioxide. The overall C5+ productivity decreases.

On the other hand, if the voidage is too large, say above 77%, that implies that there is comparatively low catalyst loading within the channel volume, and consequently too few catalyst sites available for the production of the hydrocarbon molecules. Even if the space velocity has the optimum value, the conversion and the selectivity will both decrease. The increase in gas flow resulting from the increase in voidage is insufficient to compensate for these decreases, so that C5+ productivity again decreases.

Thus the optimum catalyst structure is such as to provide a voidage between about 25% and 77%, more preferably between about 35% and 75%, for example about 71%. The catalyst should be such as to provide a productivity of at least 0.5 g C5+ per hour per gram of catalyst. With this voidage the catalyst is not swamped by excess gas, and the flow rate provides the optimum balance of selectivity and productivity. Furthermore the gas flows are large enough to ensure good temperature control, so that the conversion of carbon monoxide remains within desirable limits.

It will be appreciated that the voidage can be changed by changing the height and wavelength of the corrugations, or the shape of the corrugations, as these change the width of initially-flat foil needed to provide corrugated foil whose width is equal to that of the flow channel. The voidage can also be changed by changing the thickness of the foil, and by changing the thickness of the ceramic coating.

The invention claimed is:

1. A compact catalytic reactor for Fischer-Tropsch synthesis defining a multiplicity of first and second flow channels arranged alternately in the reactor;
    wherein the first flow channels are configured to carry a gas mixture which undergoes Fischer-Tropsch synthesis;
    wherein the second flow channels are configured to carry a coolant fluid; and
    wherein each first flow channel contains a removable gas-permeable catalyst structure comprising a non-porous metal substrate with continuous ceramic coating of substantially uniform thickness no more than 200 μm on at least one surface of said substrate, said ceramic coating incorporating catalytic material, said catalyst structure defining mesopores and macropores providing a pore surface area in the range 80-120 $m^2/g$, and said catalyst structure being shaped for defining a multiplicity of bulk flow paths therethrough, wherein the voidage which comprises the proportion of the cross-sectional area of the first flow channel constituted by the said multiplicity of bulk flow paths is between 60% and 72%.

2. A reactor as claimed in claim 1 wherein said voidage is about 71%.

3. A reactor as claimed in claim 1 wherein said metal substrate of the catalyst structure comprises an aluminium-bearing ferritic steel.

4. A reactor as claimed in claim 1, wherein said metal substrate of the catalyst structure comprises a metal foil of thickness less than 100 μm.

5. A reactor as claimed in claim 1 wherein said catalyst structure comprises a ceramic coating of thickness between 60 and 100 μm.

6. A plant for converting natural gas to longer chain hydrocarbons incorporating a steam reforming reactor for generating a synthesis gas, and a Fischer-Tropsch reactor as claimed in claim 1 for generating longer chain hydrocarbons.

7. A reactor as claimed in claim 2 wherein said metal substrate of the catalyst structure comprises an aluminium-bearing ferritic steel.

8. A reactor as claimed in claim 2 wherein said metal substrate of the catalyst structure comprises a metal foil of thickness less than 100 μm.

9. A reactor as claimed in claim 3 wherein said metal substrate of the catalyst structure comprises a metal foil of thickness less than 100 μm.

10. A reactor as claimed in claim 2 wherein said catalyst structure comprises a ceramic coating of thickness between 60 and 100 μm.

11. A reactor as claimed in claim 3 wherein said catalyst structure comprises a ceramic coating of thickness between 60 and 100 μm.

12. A reactor as claimed in claim 4 wherein said catalyst structure comprises a ceramic coating of thickness between 60 and 100 μm.

13. A plant for converting natural gas to longer chain hydrocarbons incorporating a steam reforming reactor for generating a synthesis gas, and a Fischer-Tropsch reactor as claimed in claim 2 for generating longer chain hydrocarbons.

14. A plant for converting natural gas to longer chain hydrocarbons incorporating a steam reforming reactor for generating a synthesis gas, and a Fischer-Tropsch reactor as claimed in claim 3 for generating longer chain hydrocarbons.

15. A plant for converting natural gas to longer chain hydrocarbons incorporating a steam reforming reactor for generating a synthesis gas, and a Fischer-Tropsch reactor as claimed in claim 4 for generating longer chain hydrocarbons.

16. A plant for converting natural gas to longer chain hydrocarbons incorporating a steam reforming reactor for generating a synthesis gas, and a Fischer-Tropsch reactor as claimed in claim 5 for generating longer chain hydrocarbons.

* * * * *